Dec. 12, 1972  R. F. ROMANOWSKI ET AL  3,705,964
POSITION INDICATING INSTRUMENT WITH CIRCUIT CONTROL SWITCHES
Filed Dec. 18, 1970  2 Sheets-Sheet 1

INVENTORS
MICHAEL CELLINI
ROBERT F. ROMANOWSKI
BY
Stephen J. Rudy
ATTORNEY

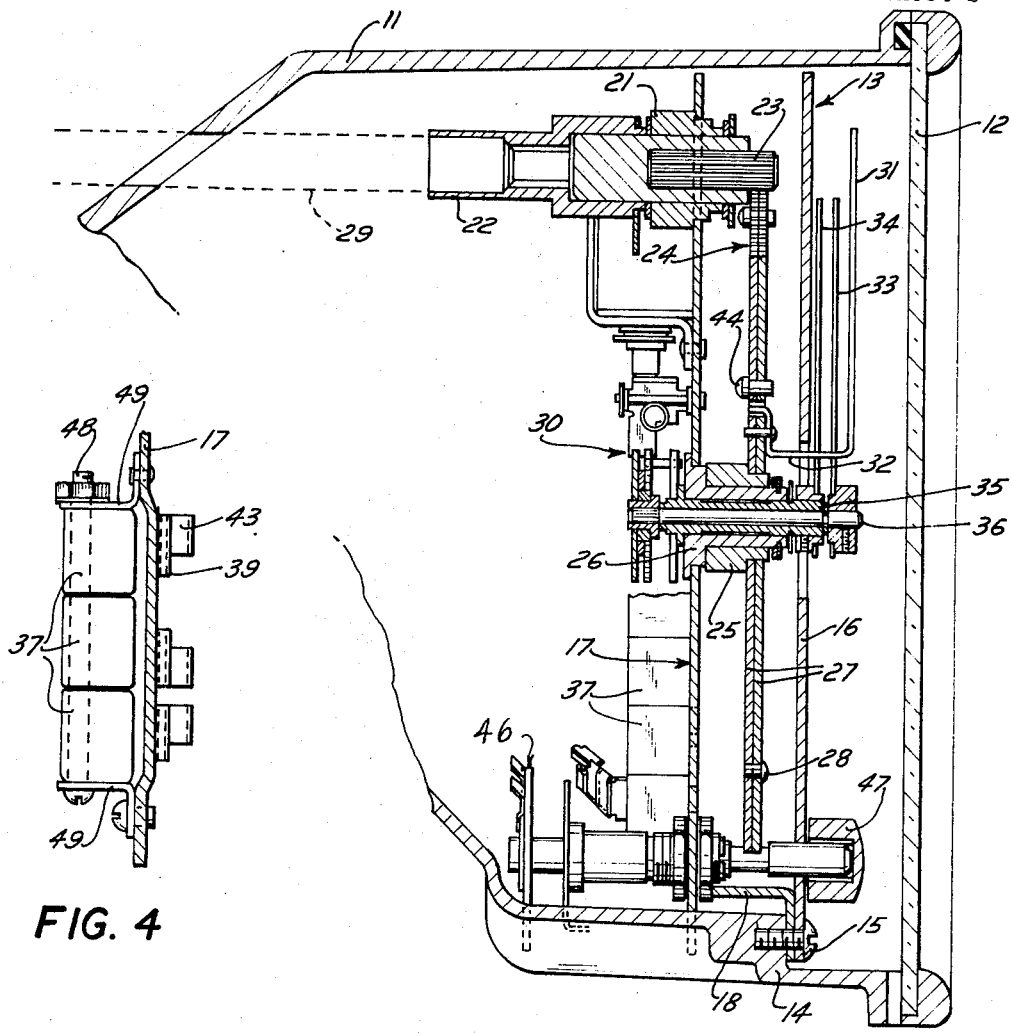
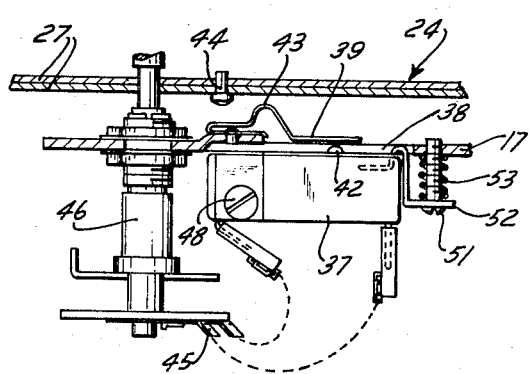
FIG. 4
FIG. 2
FIG. 3
INVENTORS
MICHAEL CELLINI
ROBERT F. ROMANOWSKI
BY
ATTORNEY

United States Patent Office 3,705,964
Patented Dec. 12, 1972

3,705,964
POSITION INDICATING INSTRUMENT WITH CIRCUIT CONTROL SWITCHES
Robert F. Romanowski, Rochester, and Michael Cellini, Henrietta, N.Y., assignors to Qualitrol Corporation, Fairport, N.Y.
Filed Dec. 18, 1970, Ser. No. 99,457
Int. Cl. H01h 43/10
U.S. Cl. 200—56 R          11 Claims

ABSTRACT OF THE DISCLOSURE

An instrument with internal mechanism having a gear driven by a flexible shaft of an associated voltage regulator. As the gear turns, studs thereon cooperate with tripping elements to actuate circuit control switches mounted in groups upon a stationary plate. Selective adjustment may be made of individual switches relative to the tripping elements. As the gear turns, indicators are moved to indicate the extent of directional turning of the gear. The internal mechanism can be assembled or removed as a unit through a front end of the housing covered by a detachable bezel. Readily removable screws secure the unit in the housing.

BACKGROUND OF THE INVENTION

This invention is concerned with a position indicating instrument. Such instruments are designed to indicate high and low readings or positions of associated devices with which they may be connected.

An instrument of this general nature is known from Pat. No. 3,041,997. The present invention is directed to providing an improved instrument of this nature which, while subject to other applications, is especially suited for use in association with a voltage regulator of a type having variable tap changing mechanism.

The improved instrument of the present invention is operable to not only indicate high and low positions occurring in the tap changing mechanism, but also to establish corresponding control circuits back to the regulator as the tap changing action takes place.

A feature of this improved instrument lies in the use of a gear which is responsive to actions of the externally associated regulated regulator. The gear of the present invention not only carries an indicating pointer relative to a dial, but also carries switch actuating elements whereby the control circuits are established as the gear turns in one direction or the other.

Another feature of the invention lies in the arrangement of control circuit switches upon a mounting plate, and of studs on the body of the gear, which studs cooperate with the various switches to establish the various circuits as the gear turns.

A further feature lies in the nature of the internal mechanism of the improved instrument. It is so arranged that it may be readily inserted or removed as a unit from the instrument's housing. This serves to facilitate repairs, replacement or adjustments.

A still further feature lies in means for adjusting, as needed, the proximity of the switches relative to switch tripping elements which in turn are actuable by the studs carried by he gear member. This feature is of patricular advantage in that it not only facilitates necessary adjustments but also assures positive actuation of the switches upon cooperation of the studs with the tripping elements.

BRIEF DESCRIPTION OF DRAWING

In the accompanying drawing:
FIG. 2 is a vertical section through the instrument;
FIG. 3 is a detail of a control circuit switch and the manner of its association with the gear member;
FIG. 4 is a detail showing the manner of support to the mounting plate of a bracket containing a group of switches.

DESCRIPTION OF A PREFERRED EMBODIMENT

Figure 1:
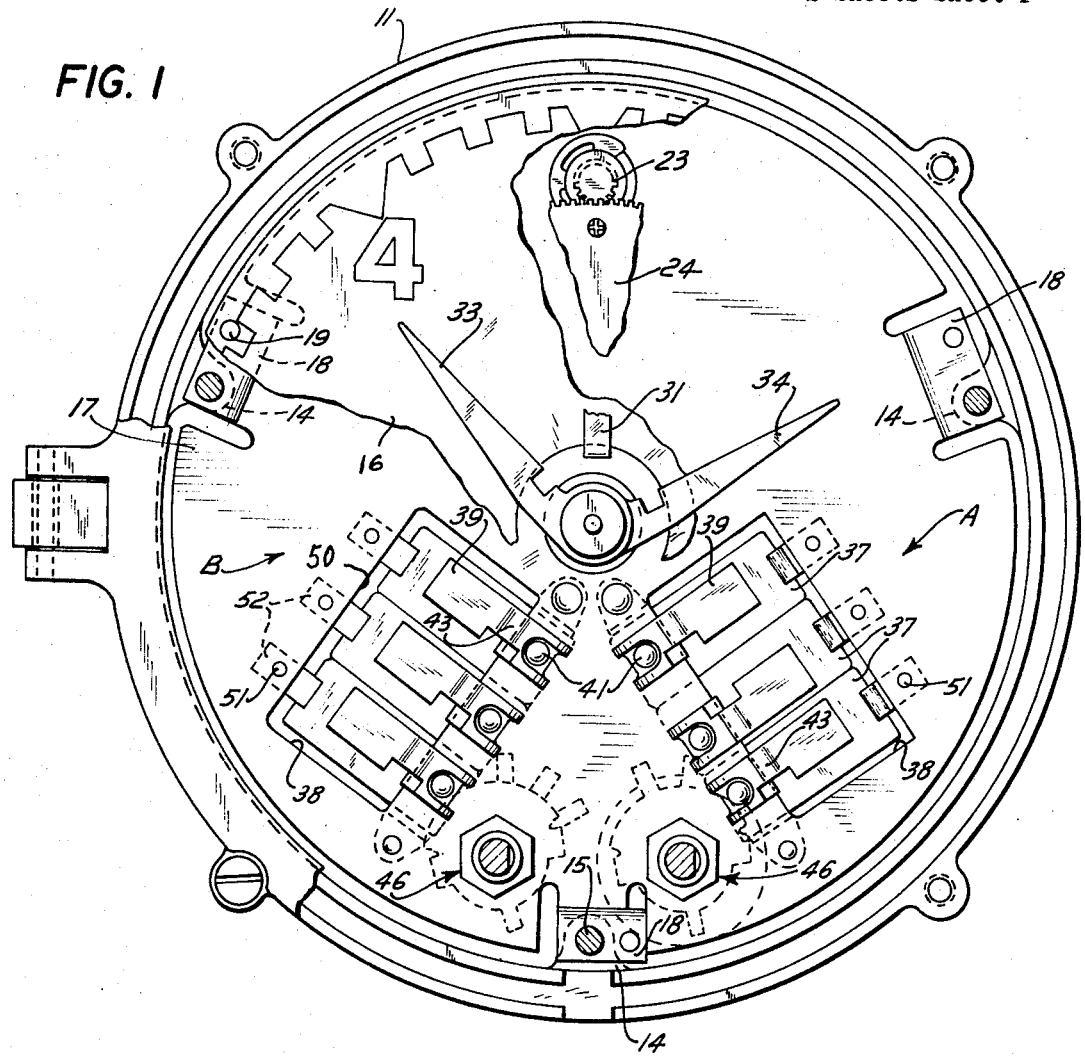
FIG. 1 is a view of the forward end, with various portions broken away, of a position indicating instrument embodying the invention.

The instrument shown in the drawing as embodying the invention is designed primarily for association with a conventional voltage regulator (not shown) to indicate tap changing positions occurring in the regulator and to provide a continuity of circuit information back to the regulator in response to the developing tap changing action.

The instrument includes a housing 11 having an open front end closed by a bezel glass 12. The bezel frame is detachably mounted to the housing so that it may be readily removed when needed to allow easy access to the internal mechanism 13 of the instrument. The mechanism 13 is a fully assembled unit which is entered as such through the bezel entrance and is anchored in place to internal lugs 14 of the housing by means of screws 15, here three in number. A desirable advantage of this arrangement is that when the internal mechanism requires repairs or replacement it is only necessary to remove the three screws and then withdraw the entire mechanism as a unit out through the front end of the housing.

The internal mechanism 13 includes a dial plate 16. Rearwardly of the dial plate and in parallel spaced relation thereto is a mounting plate 17 having three forwardly offset tabs 18 to which the dial plate is riveted, as at 19 (FIG. 1). The screws 15 pass through the dial plate and the tabs to support the mechanism 13 as a unit to the lugs 14.

Rotatably supported in a bushing 21 of the mounting plate is an input drive shaft 22 carrying a pinion 23 drivingly engaged with a gear 24. The gear is positioned between the mounting and dial plates in parallel spaced relation to both. The gear is mounted by means of an axial hub portion 25 upon a bushing 26 for relative rotation. The bushing 26 is fixed to the mounting plate.

The gear 24 comprises a pair of discs or circular plates 27 riveted together, as indicated at 28, its gear teeth being formed about the peripheries of the plates. This construction is of decided advantage in that it not only allows for economy in the manufacture of the gear, but also provides a relatively thin but strong bodied gear.

The drive shaft 22 has an internal releasable spline connection with a flexible shaft 29 connected to the output of rotary tap changing mechanism in the externally located associated voltage regulator (not shown). The gear is caused to turn in one direction or the other, accordingly, as the flexible shaft is turned by the tap changing mechanism.

A pointer 31, extending radially to the axis of the gear and in parallel spaced forward relation to the dial plate, has an offset arm 32. The latter extends axially through an opening in the dial plate and is riveted at its free end to the body of the gear. The pointer is carried relative to a graduated scale on the dial plate, accordingly, as the gear is turned in one direction or the other. The offset arm 32 of the pointer is cooperable, as the pointer moves, with one or the other of a pair of indicator hands 33, 34. In this cooperation, the pointer pushes ahead of its relative to the dial scale the particular indicator hand which it is caused to engage.

The indicator hand 34 is fixed at its hub upon a hollow shaft 35 supported coaxially of the bushing 25 for relative turning. The other hand 33 is fixed at its hub upon a shaft 36 supported coaxially of the shaft 35 for relative turning. The indicator hands serve to indicate relative to the dial scale the maximum positions to which the pointer has turned in either direction from a neutral 12 o'clock position. These maximum positions correspond to, or indicate the maximum high and low positions that the tap changing mechanism has obtained in the associated voltage regulator. Selectively operable spring loaded mechanism 30, not essential to the understanding of this invention, is provided for returning the hands back to their normal positions.

As the gear turns to cause the pointer and indicator hands to indicate the tap changing conditions occurring in the voltage regulator, it also cooperates with one or more electrical control circuit switches 37 to establish continuity or informative circuits back to the regulator to provide a predetermined controlled operation of the latter. The arrangement enabling this cooperative association of the gear with the switches represents a further and desirable advantageous feature of this invention.

In this arrangement, the switches are supported to the rear face of the mounting plate 17. Each switch, as appears in FIGS. 1 and 3, has a front face exposed through an opening 38 in the mounting plate. On the opposite or forward face of the mounting plate a separate switch actuating leaf spring or switch tripping element 39 is associated with each switch. Each spring is riveted, as at 41, at its lower end to the mounting plate in such manner that the upper free end portion of the spring fronts in close proximity a spring biased push pin 42 projecting from the exposed face of its related switch, as best seen in FIG. 3.

Each spring is formed intermediately of its ends with a knee bend or rise 43. The latter projects into the path of movement or orbit of one or more studs 44 projecting axially from the opposed rear face of the gear. It can be seen that as the gear turns and the rounded nose of a stud is caused to ride over the knee of a spring, the upper free end of the spring will be pressed resiliently inwardly of the opening 38 of the mounting plate. In doing this, the spring will actuate the related switch as it depresses its push pin. As the stud next rides clear of the knee, the spring and the spring biased push pin will restore to normal.

As each switch is actuated, it closes a control circuit back through connected terminals 45 of a related rotary selector switch 46 to the voltage regulator. The circuits are of an informative nature directed to obtaining an orderly operation of the regulator; their specific nature is not necessary to an understanding of this invention.

The switches in the illustrated instrument are arranged in two groups, of which group A is located in the second quadrant (clockwise of FIG. 1) of the mounting plate adjacent an opening 38; and group B is located in the third quadrant adjacent a second opening 38. A pair of rotary selector switches 46 is provided to serve both groups. Each of the selector switches is supported in the mounting plate and is provided with a manipulative knob 47 for presetting in conventional manner various terminal selections.

The switches 37 in each group are arranged in side by side relation and are pivotally supported at their lower ends upon a common bolt 48 (FIG. 4) slidably received through the several housings of the switches. The bolt is supported at its ends in the ears of a pair of end brackets 49. The brackets are fixed to the mounting plate just below the lower edge of the related opening 38. The opening 38 is of rectangular form. It is sufficiently large enough to be common to the several switches of the related group; and its upper edge 50 rises clear of the tops of the housings of the switches.

Each switch is individually supported at its upper end by means of a tab extension 52 upon the shank of a separate screw 51. The screw passes loosely through a hole in the tab and is threaded at its end in the mounting plate 17. A compression spring 53 constantly presses the tab against the head of the bolt and thus normally resists pivoting of the related switch upon the bracket bolt 48.

Each switch is supported in close proximity to its related switch trip spring 39 so that when a stud 44 of the gear rides over the knee 43 of the spring, the free end of the spring will move inwardly of the opening 38 to depress the related push pin 42 to trip the switch.

The pivoted manner in which each switch is supported is a desirable and advantageous further feature of this invention. It enables each switch in a group to be pivotally adjusted independently of the others when the occasion requires so as to precisely position its push pin relative to the related trip spring. To make an adjustment of any selected switch, it is only necessary for the operator to screw the related screw 51 relative to the mounting plate so as to pivot the switch as needed inwardly or outwardly relative to the related trip spring. The compression spring 53 will serve to retain the switch in its adjusted position.

A further advantageous feature of this invention lies in the particular orderly arrangement of the switches and their trip springs 39 upon the mounting plate and in the orbital arrangement of the studs 44 upon the gear for cooperation with the trip springs.

Figure 5:
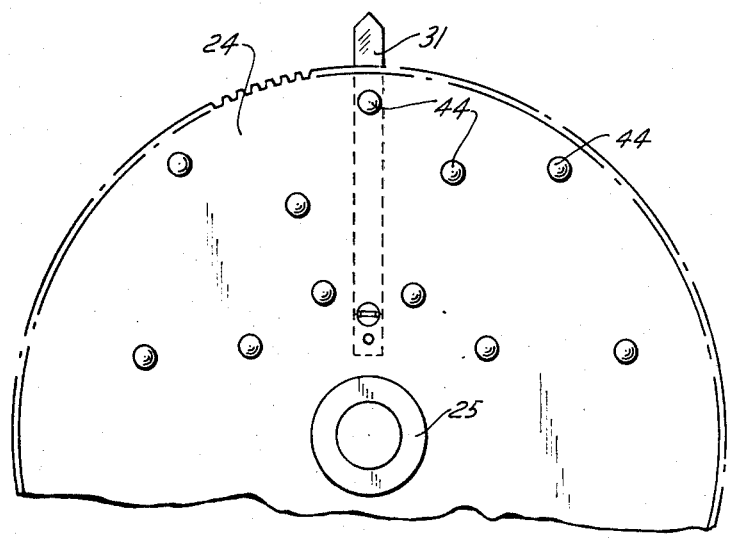
FIG. 5 is a fragmentary portion of the gear member showing the arrangement of the studs.

The A and B groups of switches, as best appears in FIG. 1, are arranged at angle to one another in such manner that line extensions drawn through the supporting bolts 48 of both groups meet in a common point on the north-south diameter of the mounting plate. Further, the knee bends of the several switches of group A are aligned and succeed one another along the line of a common radius of the mounting plate; and the knee bends of the switches of group B are similarly arranged along a line of a common radius of the mounting plate. In this arrangement, the knee bends of correspondingly positioned springs of the A and B groups of switches lie in a common orbit; and are subject to being actuated by one or more studs having a corresponding orbit position in the gear member as the latter is turned. The studs have been entered into different orbits of the gear member in accordance with a predetermined pattern, as appears in FIG. 5, the studs being located at various radial distances from the axis of the gear member. In this manner, the studs will cause actuation of certain assigned switches, as determined by the turning of the gear in response to tap changing conditions occurring in the particular associated voltage regulator.

What is claimed is:

1. A position indicating instrument having a housing wherein there is confined as a separable unit a position indicating mechanism, the mechanism comprising: an indicating dial, a mounting-plate, a rotatable gear driven disc disposed between the dial and mounting-plate in parallel spaced relation to each, a pointer carried by the disc for angular movement relative to the dial as the disc turns on its axis, control circuit switch means mounted upon the mounting-plate, stud means projecting from a face of the disc having cooperation with the switch means to actuate the latter during turning of the disc on its axis, a pair of position indicating hands supported for angular movement relative to the dial, and means carried by the pointer having cooperation with one or the other of the hands to push the hand ahead of it accordingly as the pointer is angularly moved by the disc in one direction or the other.

2. A position indicating instrument as in claim 1, wherein the housing has an open front end and internal shoulder means, the position indicating mechanism is a fully assembly unit received as such within the housing through its open front end, and screw elements releasably mount the assembled unit to the shoulder means.

3. A position indicating instrument as in claim 1, wherein a pair of the switch means is mounted to the mounting plate each having a separate switch tripping element projecting into the same path of movement of a stud means carried by the geared disc.

4. A position indicating instrument as in claim 3, wherein each switch means has a push pin in opposed relation to a tripping element, and adjusting means is provided pivotally mounting each switch means to the mounting plate for varying the proximity of its push pin to the tripping element.

5. A position indicating instrument as in claim 1, wherein several stud means are carried by the geared disc located at various radial distances from the axis of the geared disc, and several switch means are mounted to the mounting plate, each switch means having an individual tripping element projecting into the path of movement of a separate one of the stud means.

6. A position indicating instrument as in claim 5, wherein the several switch means are arranged in symmetrical groups in which the tripping elements in each group succeed one another radially, and correspondingly located tripping elements of the groups project into a common path of movement of a certain stud means of the geared disc.

7. A position indicating instrument comprising a stationary dial plate, a rotatable disc disposed in parallel rearwardly spaced relation to the dial plate having peripherl gear, a pointer arranged parallel to and forwardly of the dial plate having a rearwardly extending arm fixed to the disc enbling angular movement of the pointer with the disc relative to the dial plate, a rotatable input drive having a driving connection with the gear, a stud rigid with the disc and projecting from a face thereof, a stationary mounting plate arranged rearwardly of and in spaced parallel relation to the disc, a control circuit switch mounted to a rear face of the mounting plate having a switch actuating pin projecting into an opening in the mounting plate, switch trip means mounted to a forward face of the mounting plate in overlying relation to the pin, the trip means being a leaf spring having a knee bend projecting into the path of movement of the stud for engagement by the stud as the latter is carried about by the disc, the spring being depressible upon being engaged by the stud to actuate the pin, and a position indicating hand supported for angular movement relative to the dial plate, the arm of the pointer having cooperation with the hand when moving in a particular direction to push the hand ahead of it.

8. A position indicating instrument as in claim 7, wherein there is a plurality of said switches pivotably mounted upon a common pivot rod supported to the mounting plate, a separate leaf spring overlying the pin of each switch, a separate stud in the disc for cooperation with a separate one of the leaf springs during rotation of the disc, and means individual to each switch for adjustably pivoting the switch relative to its related leaf spring independently of the other switches and locking it in its adjusted position.

9. A position indicating instrument comprising a housing having a window at its front and internal shoulders, a compact position indicating unit received into the housing as a unit through the window and removably mounted as such to the shoulders, the unit comprising: a mounting plate having an axially extending shaft, a disc supported axially upon the shaft in forwardly spaced parallel relation to the plate for rotation relative to the shaft, drive gearing supported in the plate for relative rotation having driving engagement with a surface gear about the periphery of the disc, flanges extending forwardly from the plate, a dial disposed in forwardly spaced parallel relation to the disc having an axial opening through which the shaft freely projects, the dial being fixed to forward ends of the flanges, releasable means securing the forward ends of the flanges to the shoulders, a first radially extending position indicator hand supported upon the projecting end of the shaft for turning relative to the shaft and relative to the face of the dial, a second radially extending position indicator hand supported upon the projecting end of the shaft forwardly of the first hand for turning relative to the shaft and to the face of the dial, a radially extending pointer disposed forwardly of both hands having an arm extending rearwardly between opposed sides of both hands and fixed to the disc, the pointer arm having cooperation with one of the hands when moving clockwise to push the hand a corresponding distance and having similar cooperation with the other hand when moving in a counterclockwise direction, a plurality of studs projecting rearwardly from the disc, an opening in the mounting plate a bracket fixed to a rear face of the mounting plate supporting a rod adjacent and parallel to one edge of the opening, a bank of separate switch boxes each pivoted at one end upon the rod and having an inner face exposed through the opening from each of which faces projects a depressible switch pin, a plurality of leaf springs mounted to the opposite face of the mounting plate, each spring having a free end overlying a separate one of the pins and adapted when pressed inwardly of the opening to depress the pin, each spring having a knee-bend projecting into the path of movement of a separate one of the studs in the disc, each stud being cooperable with the knee-bend of the related leaf spring to press the latter against the related pin, and adjustable screw means individual to the other end of each switch box for adjustably pivoting a related switch box about its pivot independently of the other switch boxes so as to adjust the proximity of its pin relative to the overlying leaf spring and for securing the switch box in its adjusted position.

10. In an instrument as in claim 9, wherein the drive gearing includes a spindle having a spline socket for receiving a complementary splined end of an externally driven flexible drive shaft.

11. In an instrument as in claim 10, wherein a rotary selector switch has a shaft rotatably mounted in the mounting plate and is provided with a turn-knob which is accessible through the window.

References Cited

UNITED STATES PATENTS

| 3,307,382 | 3/1967 | Hacker et al. | 200—38 C X |
|---|---|---|---|
| 3,182,150 | 5/1965 | Smith | 200—153 T X |
| 2,843,687 | 7/1958 | Murphy | 200—56 R |
| 3,398,249 | 8/1968 | Dessert | 200—168 C |
| 3,234,805 | 2/1966 | Slonneger | 200—38 C X |
| 2,458,544 | 1/1949 | Watson | 200—38 CA X |
| 2,527,061 | 10/1950 | Haigh | 200—38 DA |
| 3,352,987 | 11/1967 | Machado et al. | 200—153 T X |
| 2,620,412 | 12/1952 | Ford | 200—56 R |
| 2,904,652 | 9/1959 | Crane et al. | 200—153 T X |
| 3,177,310 | 4/1965 | Deeken | 200—38 CA |

JAMES R. SCOTT, Primary Examiner

U.S. Cl. X.R.

200—38 C, 38 R